(12) United States Patent
Ozaki

(10) Patent No.: US 12,218,547 B2
(45) Date of Patent: Feb. 4, 2025

(54) ROTOR

(71) Applicant: DENSO CORPORATION, Kariya (JP)

(72) Inventor: Masanori Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 247 days.

(21) Appl. No.: 17/889,837

(22) Filed: Aug. 17, 2022

(65) Prior Publication Data

US 2022/0393531 A1 Dec. 8, 2022

Related U.S. Application Data

(63) Continuation of application No. PCT/JP2021/005604, filed on Feb. 16, 2021.

(30) Foreign Application Priority Data

Feb. 17, 2020 (JP) .................................. 2020-024208

(51) Int. Cl.
    *H02K 1/276* (2022.01)
    *H02K 1/27* (2022.01)
    (Continued)

(52) U.S. Cl.
    CPC ............... *H02K 1/276* (2013.01); *H02K 1/27* (2013.01); *H02K 1/274* (2013.01); *H02K 1/2746* (2013.01)

(58) Field of Classification Search
    CPC ........ H02K 1/27; H02K 1/2706; H02K 1/274; H02K 1/2746; H02K 1/246; H02K 1/276;
(Continued)

(56) References Cited

U.S. PATENT DOCUMENTS

| | | | | |
|---|---|---|---|---|
| 2003/0102755 A1* | 6/2003 | Naito | ............... | H02K 1/2766 310/156.56 |
| 2015/0318743 A1* | 11/2015 | Baba | ............... | H02K 1/2766 310/156.38 |

(Continued)

FOREIGN PATENT DOCUMENTS

| | | | |
|---|---|---|---|
| DE | 112014006129 | * | 9/2016 |
| JP | 2015061430 A | * | 3/2015 |

(Continued)

OTHER PUBLICATIONS

Kawasaki et al, Rotating Electrical Machine, Sep. 29, 2016, DE 112014006129 (English Machine Translation) (Year: 2016).*

(Continued)

*Primary Examiner* — Alexander A Singh
(74) *Attorney, Agent, or Firm* — Oliff PLC

(57) ABSTRACT

A rotor includes a rotor core having magnet-receiving holes formed therein, and permanent magnets embedded respectively in the magnet-receiving holes of the rotor core. Each of the permanent magnets has a folded shape that is convex radially inward. The rotor is configured to generate both magnet torque by the permanent magnets and reluctance torque by outer core portions located on a radially outer side of the permanent magnets in the rotor core. Each of radially-outer end portions of the magnet-receiving holes has a curved shape such that the distance between the radially-outer end portion and a radially outer periphery of the rotor core is shortened at a center of the radially-outer end portion in a circumferential direction of the rotor.

3 Claims, 6 Drawing Sheets

(51) Int. Cl.
*H02K 1/274* (2022.01)
*H02K 1/2746* (2022.01)

(58) Field of Classification Search
CPC .. H02K 1/2766; H02K 29/03; H02K 2213/03; H02K 21/16
USPC ........................................ 310/156.39, 156.56
See application file for complete search history.

(56) References Cited

U.S. PATENT DOCUMENTS

2017/0170696 A1 6/2017 Ogawa et al.
2019/0089216 A1 3/2019 Sano et al.

FOREIGN PATENT DOCUMENTS

| JP | 2019-41530 A | 3/2019 |
| JP | 2019-68655 A | 4/2019 |
| JP | 2019-126102 A | 7/2019 |

OTHER PUBLICATIONS

Yoshizumi et al, Embedded Magnet Type Motor, Mar. 30, 2015, JP 2015061430 (English Machine Translation) (Year: 2015).*

* cited by examiner

ROTOR

CROSS-REFERENCE TO RELATED APPLICATIONS

The present application is a continuation application of International Application No. PCT/JP2021/005604 filed on Feb. 16, 2021, which is based on and claims priority from Japanese Patent Application No. 2020-024208 filed on Feb. 17, 2020. The entire contents of these applications are incorporated by reference into the present application.

BACKGROUND

1 Technical Field

The present disclosure relates to interior permanent magnet rotors.

2 Description of Related Art

Conventionally, rotating electric machines have been known which employ interior permanent magnet rotors. The interior permanent magnet rotors include a rotor core having magnet-receiving holes formed therein and permanent magnets embedded respectively in the magnet-receiving holes of the rotor core. Each of the permanent magnets has a folded shape that is convex radially inward. The interior permanent magnet rotors are configured to generate both magnet torque by the permanent magnets and reluctance torque by outer core portions located on the radially outer side of the permanent magnets in the rotor core.

SUMMARY

According to the present disclosure, a rotor is provided which includes a rotor core having magnet-receiving holes formed therein, and permanent magnets embedded respectively in the magnet-receiving holes of the rotor core. Each of the permanent magnets has a folded shape that is convex radially inward. The rotor is configured to generate both magnet torque by the permanent magnets and reluctance torque by outer core portions located on a radially outer side of the permanent magnets in the rotor core. Each of radially-outer end portions of the magnet-receiving holes has a curved shape such that the distance between the radially-outer end portion and a radially outer periphery of the rotor core is shortened at a center of the radially-outer end portion in a circumferential direction of the rotor. The magnet-receiving holes have differently-shaped portions that are formed in part of an axial range of the magnet-receiving holes and shaped differently from other portions of the magnet-receiving holes. The differently-shaped portions are formed at axial centers of the magnet-receiving holes. The permanent magnets are bonded magnets filled respectively in the magnet-receiving holes. The permanent magnets axially engage with the differently-shaped portions of the magnet-receiving holes.

DESCRIPTION OF EMBODIMENTS

Figure 1:
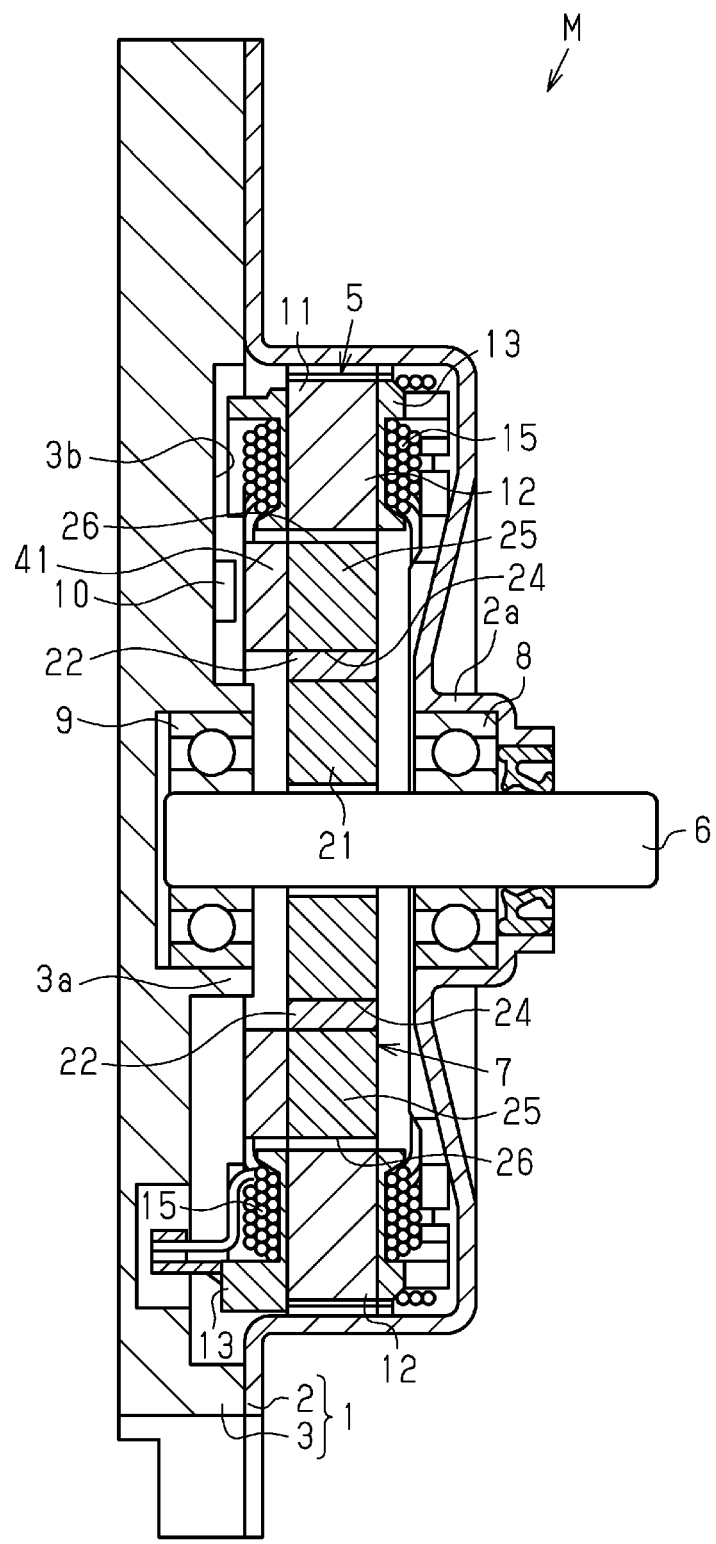
FIG. 1 is a cross-sectional view of a rotating electric machine according to an embodiment.

In an interior permanent magnet rotor known in the art (see, for example, Japanese Patent Application Publication No. JP 2019-041530 A), radially-outer end portions of the magnet-receiving holes of the rotor core have a straight shape substantially along the circumferential direction. During rotation of the rotor, stress becomes highest at circumferential ends of the radially-outer end portions of the magnet-receiving holes due to the centrifugal force; consequently, bridge portions of the rotor core may become damaged at those locations where the stress is concentrated. One may consider setting the radial position of all the radially-outer end portions of the magnet-receiving holes to be further away from a radially outer periphery of the rotor core so as to prevent the rotor core from being damaged due to the stress concentration. However, in this case, the cross-sectional areas of magnetic paths at the bridge portions, which are located on the radially outer side of the radially-outer end portions of the magnet-receiving holes, would become large; consequently, the amount of leakage magnetic flux through the magnetic paths would become large, lowering the performance of the rotating electric machine.

In contrast, in the above-described rotor according to the present disclosure, since each of the radially-outer end portions of the magnet-receiving holes has the curved shape such that the distance between the radially-outer end portion and the radially outer periphery of the rotor core is shortened at the center of the radially-outer end portion in the circumferential direction of the rotor, it becomes possible to prevent the rotor core from being damaged due to stress concentration at the circumferential ends of the radially-outer end portions of the magnet-receiving holes while suppressing the amount of leakage magnetic flux to be small. More specifically, stress becomes highest at the circumferential ends of the radially-outer end portions of the magnet-receiving holes. However, with the above curved shape of the radially-outer end portions of the magnet-receiving holes, the distance from the radially outer periphery of the rotor core becomes longer and thus the thickness of the bridge portions of the rotor core becomes larger at the circumferential ends of the radially-outer end portions of the magnet-receiving holes, thereby making it possible to prevent damage to the rotor core. Meanwhile, the distance from the radially outer periphery of the rotor core becomes shortest and thus the cross-sectional areas of magnetic paths of the bridge portions become smallest at the circumferential centers of the radially-outer end portions of the magnet-receiving holes, thereby making it possible to suppress the amount of leakage magnetic flux through the magnetic paths to be small. Moreover, since the magnet-receiving holes have the differently-shaped portions that are formed in part of the axial range of the magnet-receiving holes and shaped differently from the other portions of the magnet-receiving holes, it becomes possible to make the permanent magnets axially engage with the differently-shaped portions of the magnet-receiving holes, thereby preventing the permanent magnets from being displaced out of the magnet-receiving holes. Furthermore, since the differently-shaped portions are formed at the axial centers of the magnet-receiving holes, it becomes possible to prevent, in a well-balanced manner on both axial sides, the permanent magnets from being displaced out of the magnet-receiving holes.

Hereinafter, an embodiment of a rotating electric machine will be described with reference to FIGS. 1 to 6.

As shown in FIG. 1, the rotating electric machine M according to the present embodiment is an interior permanent magnet brushless motor designed to be used in a position control apparatus installed in an engine compartment of a vehicle, more particularly used in a valve timing control apparatus connected with an engine of the vehicle.

The rotating electric machine M includes a motor case 1. The motor case 1 has a tubular front housing 2 and an end frame 3. The front housing 2 is formed of a magnetic material in a bottomed tubular shape. The end frame 3 is formed of aluminum (i.e., non-magnetic material) and arranged to close an opening of the tubular front housing 2.

Moreover, the rotating electric machine M also includes a stator 5 fixed to an inner circumferential surface of the tubular front housing 2, and an interior permanent magnet rotor 7 arranged radially inside the stator 5 and including a rotating shaft 6. The rotating shaft 6 is supported by a pair of bearings 8 and 9 so as to be rotatable with respect to the motor case 1. The bearing 8 is received and fixed in a bearing holding portion 2a formed in the tubular front housing 2. On the other hand, the bearing 9 is received and fixed in a bearing holding portion 3a formed in the end frame 3. In addition, on an axially inner surface 3b of the end frame 3, there is fixed a magnetic sensor 10 such as a Hall-effect IC.

The rotating shaft 6 has a distal end portion protruding out of the tubular front housing 2. With rotary drive of the rotating shaft 6, the valve timing, i.e., the relative rotational phase of a camshaft to a crankshaft of the engine is suitably changed according to the operating sate of the engine.

The stator 5 is fixed to the inner circumferential surface of the tubular front housing 2. The stator 5 includes a cylindrical stator core 11, and an outer circumferential surface of the stator core 11 is fixed to the inner circumferential surface of the tubular front housing 2. On a radially inner side of the stator core 11, there are formed a plurality of teeth 12 along an axial direction of the stator core 11. The teeth 12 are arranged at equal pitches in a circumferential direction of the stator core 11 and each extend radially inward.

On the teeth 12, there are respectively wound windings 15 of three phases via insulators 13. Upon supply of a three-phase drive current to the windings 15, the stator 5 generates a rotating magnetic field, thereby causing the rotor 7 to rotate in forward and reverse directions.

The rotor 7 includes the rotating shaft 6, a substantially cylindrical rotor core 21 having the rotating shaft 6 insertion-fitted in a central part thereof, and a plurality (e.g., eight in the present embodiment) of permanent magnets 22 embedded in the rotor core 21.

Figure 2:
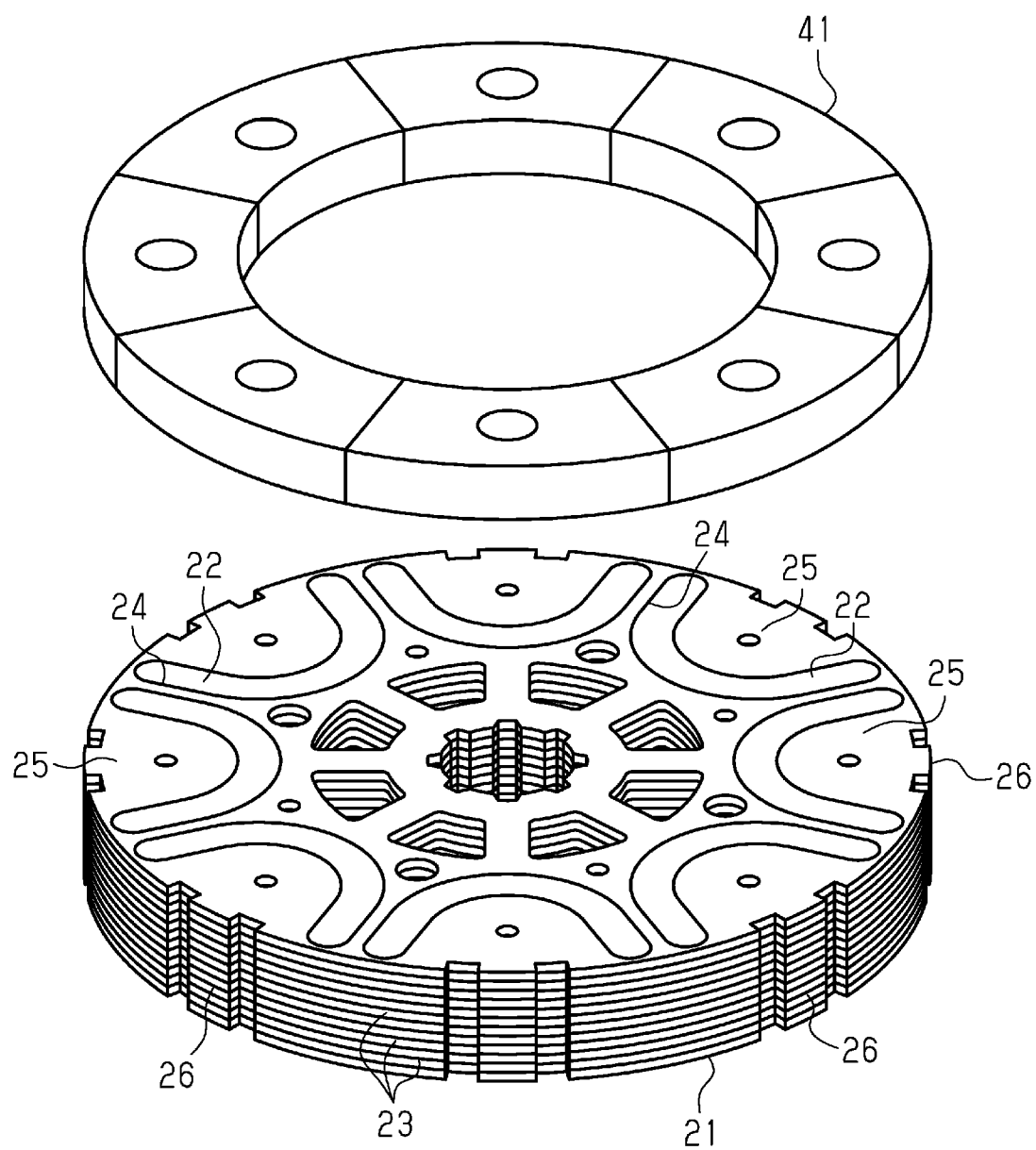
FIG. 2 is an exploded perspective view illustrating a rotor according to the embodiment.

As shown in FIG. 2, the rotor core 21 is constituted of a plurality of magnetic steel sheets 23 that are formed of a magnetic metal material and laminated in an axial direction of the rotor core 21.

Figure 3:
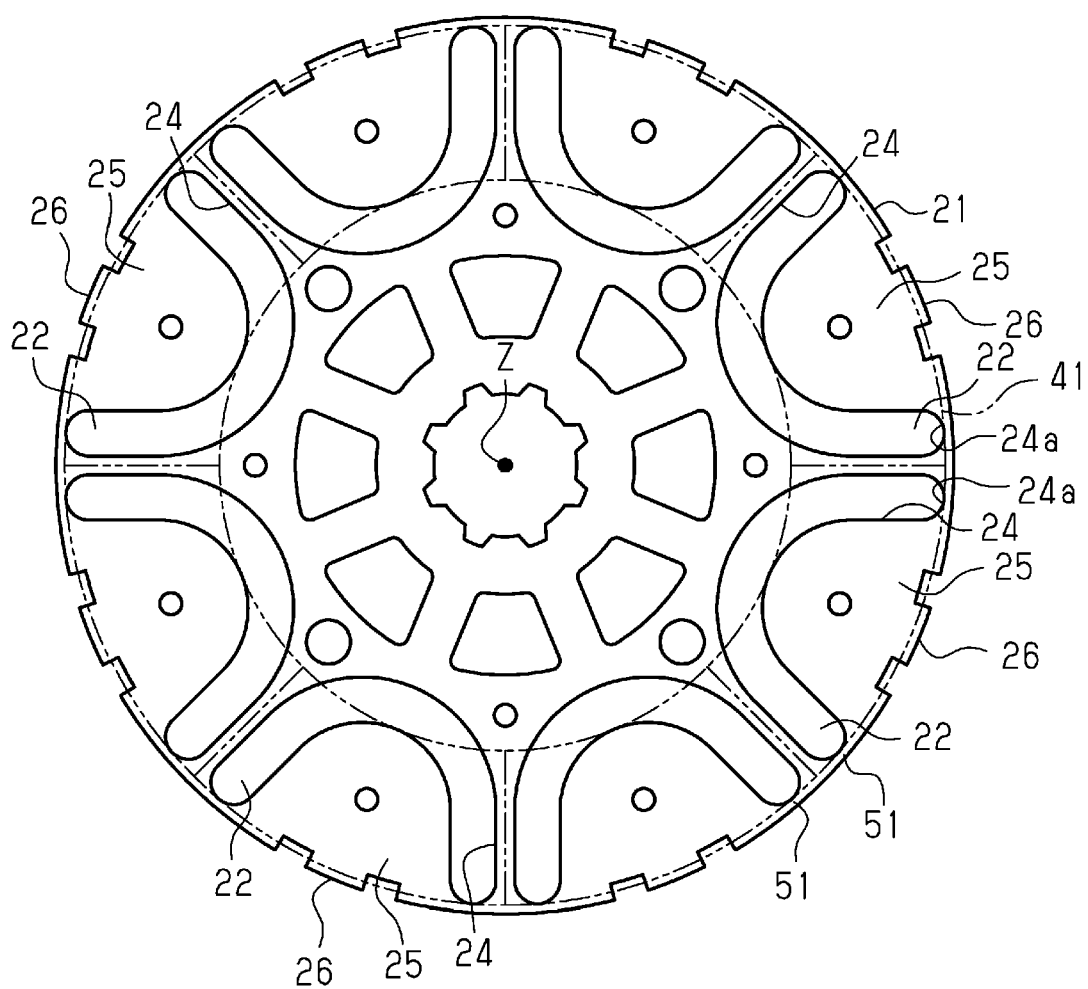
FIG. 3 is a plan view illustrating the rotor according to the embodiment.

As shown in FIGS. 1 to 3, the rotor core 21 has a plurality of magnet-receiving holes 24, in which the permanent magnets 22 are respectively received. The plurality (e.g., eight in the present embodiment) of magnet-receiving holes 24 are formed at equal intervals in a circumferential direction of the rotor core 21. Each of the magnet-receiving holes 24 has a continuous and folded substantially U-shape that is convex radially inward. In addition, all the magnet-receiving holes 24 are identical in shape to each other.

The permanent magnets 22 are implemented by bonded magnets that are formed by molding and solidifying a magnet material; the magnet material is a mixture of a magnet powder and a resin. More specifically, in the present embodiment, the magnet-receiving holes 24 of the rotor core 21 serve as forming molds. The permanent magnets 22 are formed by: filling the magnet material, which has not been solidified, into the magnet-receiving holes 24 of the rotor core 21 by injection molding without any gaps remaining therein; and then solidifying the magnet material in the magnet-receiving holes 24. Consequently, the external shape of the permanent magnets 22 conforms to the shape of the magnet-receiving holes 24 of the rotor core 21.

In the present embodiment, a samarium-iron-nitrogen-based (i.e., SmFeN-based) magnet powder is employed as the magnet powder for forming the permanent magnets 22. It should be noted that other rare-earth magnet powders may alternatively be employed as the magnet powder for forming the permanent magnets 22. Moreover, the permanent magnets 22 solidified in the magnet-receiving holes 24 of the rotor core 21 are magnetized by a not-shown magnetizing apparatus located outside the rotor core 21, so as to function as genuine magnets. More specifically, the permanent magnets 22 are magnetized so that the polarities of the permanent magnets 22 are alternately different in the circumferential direction of the rotor core 21. In addition, each of the permanent magnets 22 is magnetized in its thickness direction.

Those portions of the rotor core 21 which are located on the radially outer side of the permanent magnets 22 (i.e., those portions of the rotor core 21 which radially face the stator 5) function as outer core portions 25 to generate reluctance torque. In the present embodiment, the rotor 7 has eight rotor magnetic poles 26 each including a corresponding one of the eight permanent magnets 22 and a corresponding of the outer core portions 25 which is surrounded by the corresponding permanent magnet 22. Each of the rotor magnetic poles 26 functions as an N pole or an S pole. The rotor 7 is configured to generate both magnet torque and reluctance torque at the rotor magnetic poles 26 described above.

Next, the shape of the permanent magnets 22 will be described in detail. In addition, as described above, the shape of the permanent magnets 22 conforms to the shape of the magnet-receiving holes 24 of the rotor core 21.

Figure 4:
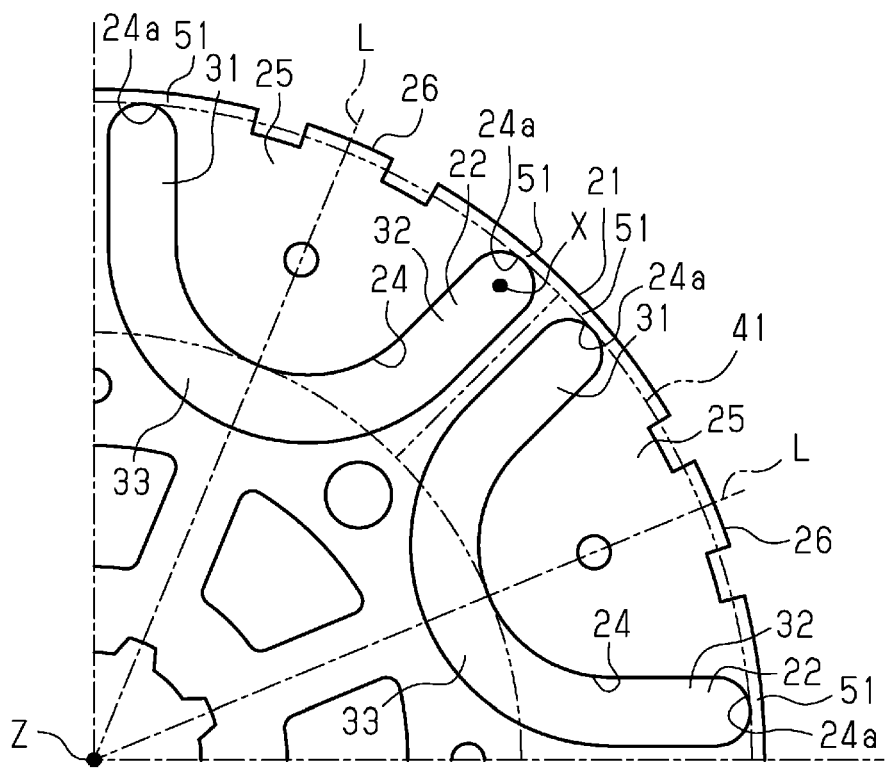
FIG. 4 is an enlarged plan view of part of the rotor according to the embodiment.

As shown in FIGS. 3 and 4, in an axial view of the rotor 7, each of the permanent magnets 22 has a continuous and folded substantially U-shape that is convex radially inward. Moreover, the shape of each of the permanent magnets 22 is symmetrical with respect to a circumferential centerline L passing through both an axis center Z of the rotor 7 and a circumferential center of the permanent magnet 22.

Each of the permanent magnets 22 has a first straight portion 31 on one circumferential side (e.g., the counterclockwise side), a second straight portion 32 on the other circumferential side (e.g., the clockwise side), and a bent portion 33 that is bent to connect radially inner ends of the first and second straight portions 31 and 32. Each of the first and second straight portions 31 and 32 extends along a radial direction of the rotor 7. More specifically, each of the first and second straight portions 31 and 32 extends parallel to a straight line passing through the axis center Z of the rotor 7. Moreover, for each circumferentially-adjacent pair of the permanent magnets 22, the adjacent first and second straight portions 31 and 32 of the pair of the permanent magnets 22 extend parallel to each other.

Moreover, in the present embodiment, the rotor 7 further includes an annular end magnet 41 that is located at a position facing axial end faces of the outer core portions 25 of the rotor core 21 and has magnetic poles arranged so as to respectively repel the outer core portions 25.

Specifically, the end magnet 41 is fixed by an adhesive to the axial end faces of the rotor core 21 and the permanent magnets 22 on one axial side thereof.

Moreover, an outer diameter of the end magnet 41 is set to be greater than or equal to an outermost diameter of the permanent magnets 22 and less than or equal to an outermost diameter of the rotor core 21. In other words, when viewed along the axial direction, a radially outer periphery of the end magnet 41 is located between a radially outermost position of the permanent magnets 22 and a radially outermost position of the rotor core 21. Furthermore, an inner diameter of the end magnet 41 is set to be equal to an innermost diameter of the outer core portions 25 of the rotor core 21. In other words, when viewed along the axial direction, a radially inner periphery of the end magnet 41 is located at a radially innermost position of the outer core portions 25 of the rotor core 21.

The end magnet 41 is magnetized in the axial direction. Moreover, the polarities of the magnetic poles of the end magnet 41 are alternately different in the circumferential direction. More particularly, in the present embodiment, the end magnet 41 is magnetized to have eight magnetic poles whose polarities are alternately different in the circumferential direction. That is, the number of the magnetic poles of the end magnet 41 is equal to the number of the permanent magnets 22 as well as to the number of the outer core portions 25 of the rotor core 21. The end magnet 41 is arranged so that each of the magnetic poles of the end magnet 41 repels a corresponding one of the outer core portions 25 of the rotor core 21, in other words, each of the magnetic poles of the end magnet 41 has the same polarity as the corresponding outer core portion 25 which faces the magnetic pole. With the above configuration, it becomes possible to reduce leakage magnetic flux which flows from or to the axial end faces of the outer core portions 25 across the axial end faces of the permanent magnets 22.

Furthermore, as shown in FIG. 1, the end magnet 41 is arranged to axially face the magnetic sensor 10 through a gap formed therebetween. The end magnet 41 constitutes a sensor magnet that enables the magnetic sensor 10 to detect a rotation angle of the rotor 7. In other words, the end magnet 41 also serves as a sensor magnet.

As shown in FIG. 4, each of radially-outer end portions 24a of the magnet-receiving holes 24 of the rotor core 21 has a curved shape such that the distance between the radially-outer end portion 24a and a radially outer periphery of the rotor core 21 continuously changes in the circumferential direction of the rotor 7 and is shortened at a circumferential center of the radially-outer end portion 24a. More particularly, in the present embodiment, each of the radially-outer end portions 24a of the magnet-receiving holes 24 has a semicircular shape about a widthwise center X of the magnet-receiving hole 24 in an axial view. That is, for each of the magnet-receiving holes 24, each pair of interior walls of the magnet-receiving hole 24, between which the first straight portion 31 or the second straight portion 32 of a corresponding one of the permanent magnets 22 is received, are connected with a semicircular shape on the radially outer side thereof. Consequently, each of bridge portions 51 of the rotor core 21 becomes thinnest at a circumferential center thereof and thickest at both circumferential ends thereof; each of the bridge portions 51 is formed radially outside a corresponding one of the radially-outer end portions 24a of the magnet-receiving holes 24.

Figure 5:
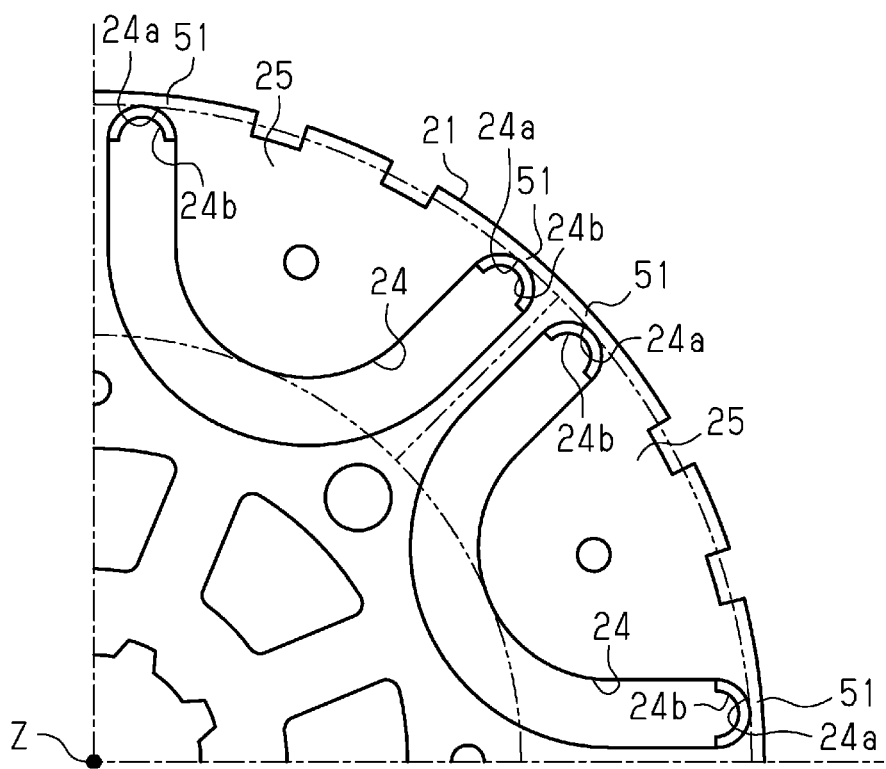
FIG. 5 is an enlarged plan view of part of a rotor core according to the embodiment.
Figure 6:
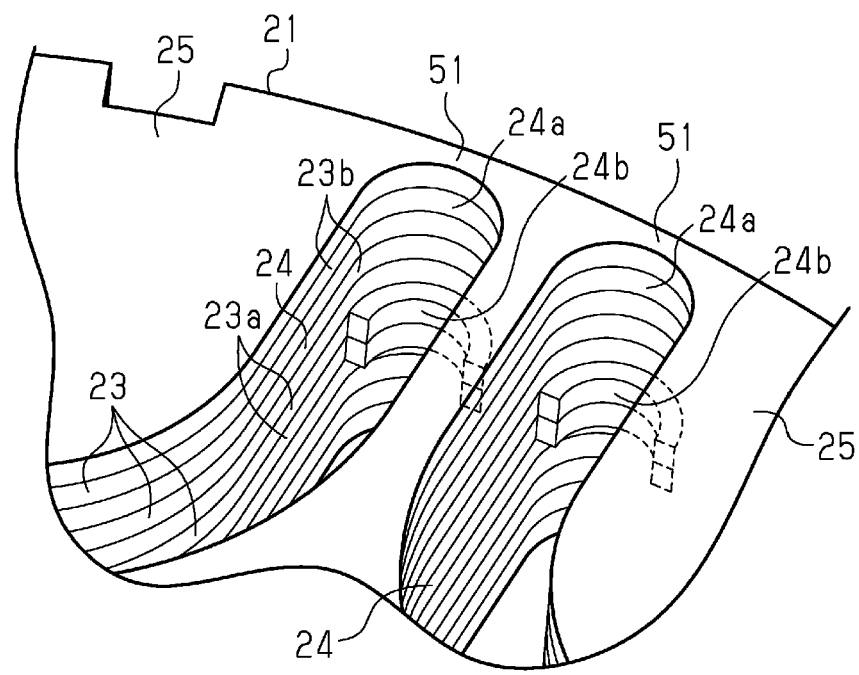
FIG. 6 is an enlarged perspective view of part of the rotor core according to the embodiment.

Moreover, as shown in FIGS. 5 and 6, each of the magnet-receiving holes 24 of the rotor core 21 has differently-shaped portions 24b each of which is formed in part of the axial range of the magnet-receiving hole 24 and shaped differently from the other portions of the magnet-receiving hole 24. It should be noted that in FIGS. 5 and 6, there is shown the rotor core 21 without the permanent magnets 22 embedded therein. Specifically, as shown in FIG. 6, each of the differently-shaped portions 24b is formed at an axial center of the magnet-receiving hole 24. Moreover, each of the differently-shaped portions 24b is formed at a corresponding one of the radially-outer end portions 24a of the magnet-receiving hole 24 and protrudes inward with respect to the other portions of the magnet-receiving hole 24. More particularly, in the present embodiment, each of the differently-shaped portions 24b is formed in a semicircular shape protruding inward from the corresponding radially-outer end portion 24a that is semicircular-shaped in an axial view. Furthermore, in the present embodiment, the differently-shaped portions 24b of the magnet-receiving holes 24 are formed by laminating a plurality of types of magnetic steel sheets 23 in the axial direction. Specifically, in the present embodiment, the magnetic steel sheets 23, which are laminated in the axial direction to form the rotor core 21, include first magnetic steel sheets 23a having a shape corresponding to the differently-shaped portions 24b of the magnet-receiving holes 24 and second magnetic steel sheets 23b having a shape corresponding to the other portions of the magnet-receiving holes 24.

Next, explanation will be given of operation of the rotating electric machine M configured as described above.

For example, at a timing based on the rotation angle of the rotor 7 detected by the magnetic sensor 10, a three-phase drive current is supplied to the windings 15 of the stator 5 from an external electric power supply. Upon supply of the three-phase drive current to the windings 15, the stator 5 generates a rotating magnetic field, thereby driving the rotor 7 to rotate. Consequently, with rotation of the rotor 7, the valve timing, i.e., the relative rotational phase of the camshaft to the crankshaft of the engine is changed according to the operating sate of the engine.

According to the present embodiment, it is possible to achieve the following advantageous effects.

(1) Each of the radially-outer end portions 24a of the magnet-receiving holes 24 has the curved shape such that the distance between the radially-outer end portion 24a and the radially outer periphery of the rotor core 21 is shortened at the center of the radially-outer end portion 24a in the circumferential direction of the rotor 7. Consequently, it becomes possible to prevent the rotor core 21 from being damaged due to stress concentration at the circumferential ends of the radially-outer end portions 24a of the magnet-receiving holes 24 while suppressing the amount of leakage magnetic flux to be small. More specifically, stress becomes highest at the circumferential ends of the radially-outer end portions 24a of the magnet-receiving holes 24. However, with the above curved shape of the radially-outer end portions 24a of the magnet-receiving holes 24, the distance from the radially outer periphery of the rotor core 21 becomes longer and thus the thickness of the bridge portions 51 of the rotor core 21 becomes larger at the circumferential ends of the radially-outer end portions 24a of the magnet-receiving holes 24, thereby making it possible to prevent damage to the rotor core 21. Meanwhile, the distance from the radially outer periphery of the rotor core 21 becomes shortest and thus the cross-sectional areas of magnetic paths of the bridge portions 51 become smallest at the circumferential centers of the radially-outer end portions 24a of the magnet-receiving holes 24, thereby making it possible to suppress the amount of leakage magnetic flux through the magnetic paths to be small.

(2) Each of the radially-outer end portions 24a of the magnet-receiving holes 24 has the semicircular shape about the widthwise center X of the magnet-receiving hole 24 in an axial view. Consequently, the thickness of the bridge portions 51 of the rotor core 21 becomes largest at both the circumferential ends of each of the radially-outer end portions 24a of the magnet-receiving holes 24, thereby making it possible to prevent, in a well-balanced manner, damage to the rotor core 21.

(3) The magnet-receiving holes 24 have the differently-shaped portions 24b that are formed in part of the axial range of the magnet-receiving holes 24 and shaped differently from the other portions of the magnet-receiving holes 24. Consequently, it becomes possible to make the permanent magnets 22 axially engage with the differently-shaped portions 24b of the magnet-receiving holes 24, thereby preventing the permanent magnets 22 from being displaced out of the magnet-receiving holes 24. In addition, in the present embodiment, with the end magnet 41 provided on the axial end faces of the permanent magnets 22, it becomes possible to more reliably prevent the permanent magnets 22 from being displaced out of the magnet-receiving holes 24.

(4) The differently-shaped portions 24b are formed at the axial centers of the magnet-receiving holes 24. Consequently, it becomes possible to prevent, in a well-balanced manner on both axial sides, the permanent magnets 22 from being displaced out of the magnet-receiving holes 24.

(5) The differently-shaped portions 24b are formed respectively at the radially-outer end portions 24a of the magnet-receiving holes 24 and protrude inward with respect to the other portions of the magnet-receiving holes 24. Consequently, it becomes possible to enhance the strength of the bridge portions 51 of the rotor core 21 which are located on the radially outer side of the magnet-receiving holes 24, while preventing the permanent magnets 22 from being displaced out of the magnet-receiving holes 24.

The above-described embodiment can be modified and implemented as follows. Moreover, the above-described embodiment and the following modifications can also be implemented in combination with each other to the extent that there is no technical contradiction between them.

In the above-described embodiment, the differently-shaped portions 24b are formed respectively at the radially-outer end portions 24a of the magnet-receiving holes 24 and protrude inward with respect to the other portions of the magnet-receiving holes 24. However, the differently-shaped portions 24b may alternatively be formed at different positions and in other shapes.

Figure 7:
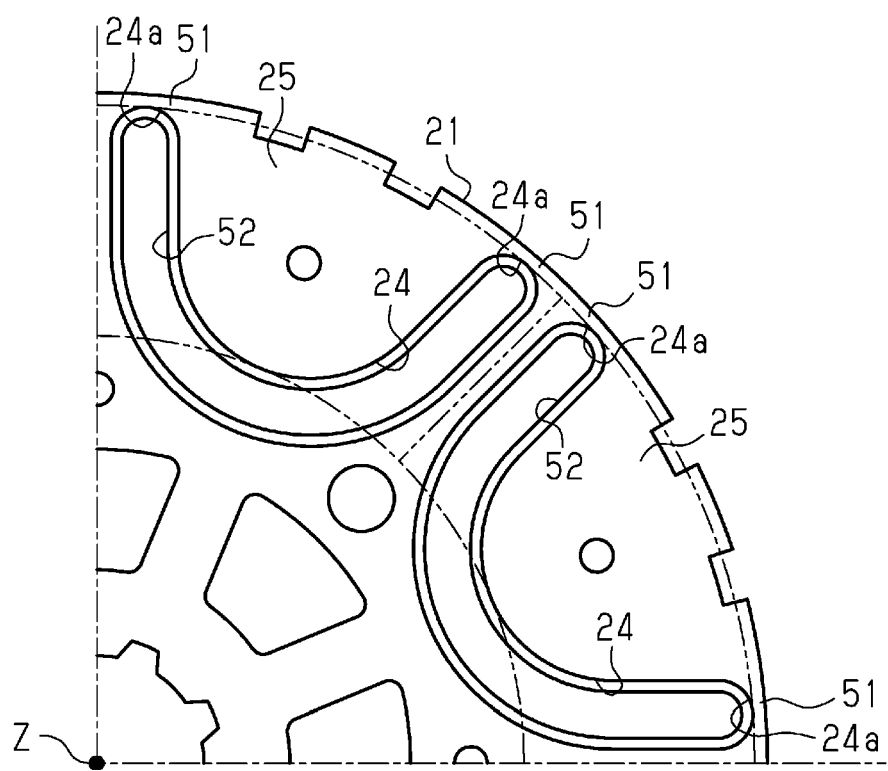
FIG. 7 is an enlarged plan view of part of a rotor core according to a modification.
Figure 8:
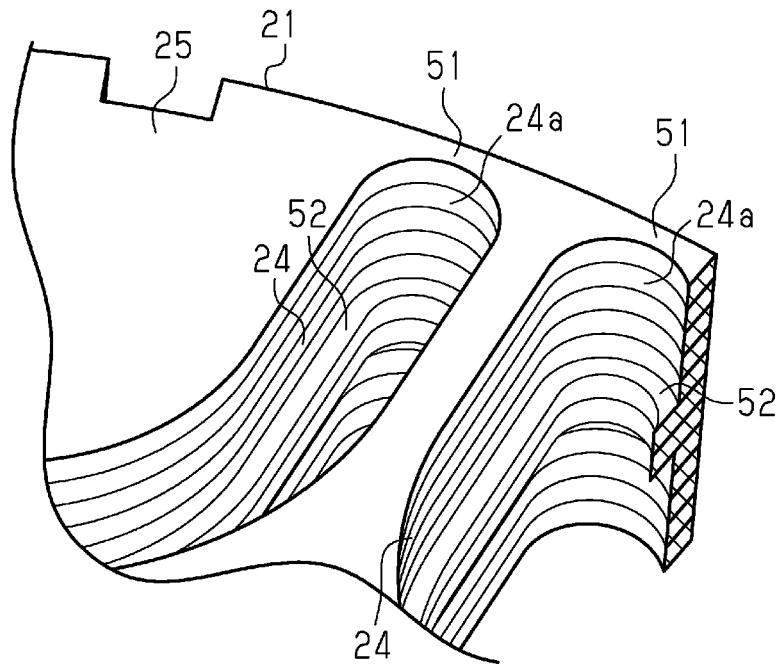
FIG. 8 is an enlarged perspective view of part of the rotor core according to the modification.

For example, as shown in FIGS. 7 and 8, differently-shaped portions 52 may be formed over the entire peripheries of the magnet-receiving holes 24 and protrude inward with respect to the other portions of the magnet-receiving holes 24. In this case, it would be possible to more reliably prevent the permanent magnets 22 from being displaced out of the magnet-receiving holes 24.

Figure 9:
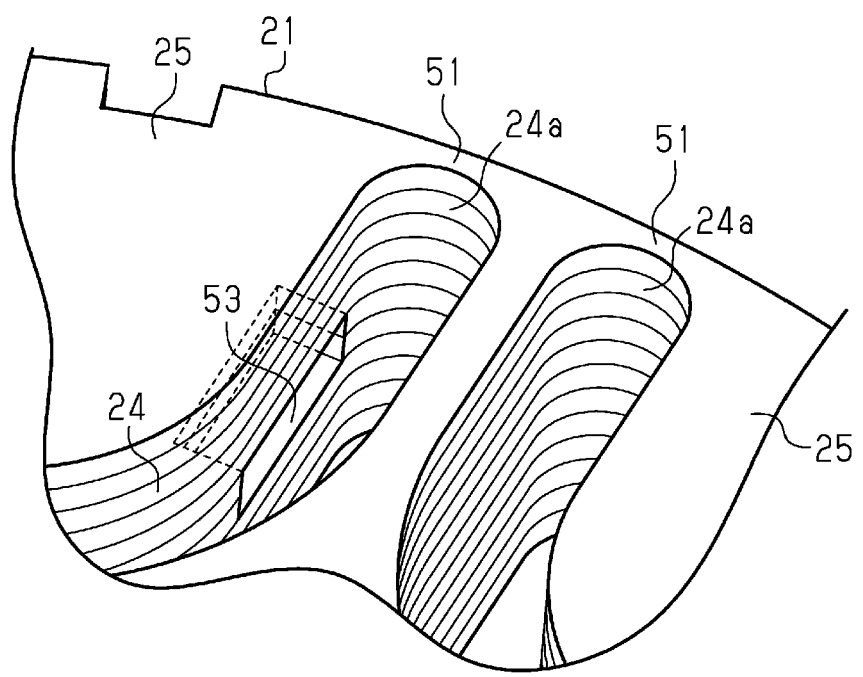
FIG. 9 is an enlarged perspective view of part of a rotor core according to another modification.

Otherwise, as shown in FIG. 9, differently-shaped portions 53 may be formed at parts of the magnet-receiving holes 24 and recessed with respect to the other portions of the magnet-receiving holes 24. In this case, the manufacture of the rotor core 21 would be facilitated.

In the above-described embodiment, each of the radially-outer end portions 24a of the magnet-receiving holes 24 is formed in the semicircular shape about the widthwise center X of the magnet-receiving hole 24. However, each of the radially-outer end portions 24a of the magnet-receiving holes 24 may alternatively be formed in other curved shapes such that the distance between the radially-outer end portion 24a and the radially outer periphery of the rotor core 21 is shortened at the circumferential center of the radially-outer end portion 24a. For example, each of the radially-outer end portions 24a of the magnet-receiving holes 24 may alternatively be formed in an elliptical shape or the like.

In the above-described embodiment, the differently-shaped portions 24b are formed at the axial centers of the magnet-receiving holes 24. However, differently-shaped portions may alternatively be formed at positions offset from the axial centers of the magnet-receiving holes 24. Moreover, differently-shaped portions may be formed at a plurality of axial positions.

In the above-described embodiment, the magnet-receiving holes 24 have the differently-shaped portions 24b that are formed in part of the axial range of the magnet-receiving holes 24 and shaped differently from the other portions of the magnet-receiving holes 24. However, the magnet-receiving holes 24 may alternatively have no differently-shaped portions.

In the above-described embodiment, the rotor 7 includes the end magnet 41 that is fixed to the axial end faces of the rotor core 21 and the permanent magnets 22. However, the rotor 7 may alternatively include no end magnet 41.

In the above-described embodiment, each of the permanent magnets 22 is configured to have the first straight portion 31, the second straight portion 32 and the bent portion 33. Alternatively, each of the permanent magnets 22 may be configured such that the entire permanent magnet 22 is curved in an axial view.

In the above-described embodiment, the permanent magnets 22 are implemented by the bonded magnets that are formed with the magnet-receiving holes 24 of the rotor core 21 serving as the forming molds. As an alternative, the permanent magnets 22 may be implemented by bonded magnets that are inserted, after being formed, respectively into the magnet-receiving holes 24 of the rotor core 21. As another alternative, the permanent magnets 22 may be implemented by sintered magnets that are inserted, after being sintered, respectively into the magnet-receiving holes 24 of the rotor core 21. In addition, in order to allow the permanent magnets 22 to have a shape corresponding to the differently-shaped portions 24b of the magnet-receiving holes 24 as in the above-described embodiment, it is preferable for the permanent magnets 22 to be implemented by the bonded magnets that are formed with the magnet-receiving holes 24 of the rotor core 21 serving as the forming molds.

In the above-described embodiment, the rotor core 21 is formed by laminating the magnetic steel sheets 23 in the axial direction. Alternatively, the rotor core 21 may be formed by, for example, sintering a magnetic powder.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotor comprising:
a rotor core having magnet-receiving holes formed therein;
permanent magnets embedded respectively in the magnet-receiving holes of the rotor core, each of the permanent magnets having a folded shape that is convex radially inward; and
an annular end magnet, wherein
the rotor is configured to generate both magnet torque by the permanent magnets and reluctance torque by outer core portions located on a radially outer side of the permanent magnets in the rotor core,
the annular end magnet is located at a position facing axial end faces of the outer core portions of the rotor core and has magnetic poles arranged so as to respectively repel the outer core portions,
each of radially-outer end portions of the magnet-receiving holes has a curved shape such that the distance between the radially-outer end portions and a radially outer periphery of the rotor core is shortened at a center of the radially-outer end portions in a circumferential direction of the rotor,
the magnet-receiving holes have differently-shaped portions that are formed in part of an axial range of the magnet-receiving holes and shaped differently from other portions of the magnet-receiving holes,
the differently-shaped portions are formed at axial centers of the magnet-receiving holes,
the permanent magnets are bonded magnets filled respectively in the magnet-receiving holes, and
the permanent magnets axially engage with the differently-shaped portions of the magnet-receiving holes.

2. The rotor as set forth in claim 1, wherein
each of the radially-outer end portions of the magnet-receiving holes has a semicircular shape about a widthwise center of the magnet-receiving holes.

3. The rotor as set forth in claim 1, wherein
the differently-shaped portions are formed respectively at the radially-outer end portions of the magnet-receiving holes and protrude inward with respect to the other portions of the magnet-receiving holes.

* * * * *